(12) United States Patent
Yeh

(10) Patent No.: US 7,369,064 B2
(45) Date of Patent: May 6, 2008

(54) KEY AND KEYBOARD

(75) Inventor: Chun-Liang Yeh, Taipei (TW)

(73) Assignee: Asustek Computer Inc., Taipei (TW)

( * ) Notice: Subject to any disclaimer, the term of this patent is extended or adjusted under 35 U.S.C. 154(b) by 145 days.

(21) Appl. No.: 11/370,909

(22) Filed: Mar. 9, 2006

(65) Prior Publication Data
US 2006/0232560 A1 Oct. 19, 2006

(30) Foreign Application Priority Data
Mar. 15, 2005 (TW) .............................. 94107930 A

(51) Int. Cl.
*H03M 11/00* (2006.01)
(52) U.S. Cl. ..................... 341/22; 200/310; 200/313; 345/168; 379/433.07

(58) Field of Classification Search ................... 341/22; 345/168, 169; 379/433.07; 200/310, 313, 200/311
See application file for complete search history.

(56) References Cited

U.S. PATENT DOCUMENTS

2003/0034240 A1* 2/2003 Duarte ........................ 200/311

* cited by examiner

*Primary Examiner*—Brian Zimmerman
*Assistant Examiner*—Hung Q Dang
(74) *Attorney, Agent, or Firm*—Birch, Stewart, Kolasch & Birch, LLP

(57) ABSTRACT

A key includes a light-permeable body, a light-shading layer and a first dye layer. The light-shading layer is formed on the surface of the light-permeable body and has a first light-permeable area and a second light-permeable area. The first dye layer is formed on the first light-permeable area.

18 Claims, 6 Drawing Sheets

KEY AND KEYBOARD

BACKGROUND OF THE INVENTION

1. Field of Invention

The invention relates to a key and a keyboard, and, in particular, to a light-permeable key and a light-permeable keyboard.

2. Related Art

Nowadays, people use keyboards to operate various electronic apparatuses, such as a computer, a mobile phone, a telephone and the like. In the modern design, the keyboard must be friendly, artistic and various, so as to satisfy the requirements of the modern human beings.

As shown in FIG. 1A, a typical key 1 is formed by printing a symbol 12 on a surface 111 of an opaque body 11 to mark the function of this key.

Recently, as shown in FIG. 1B, the manufacturer has developed a new type of key, which is a light-permeable key 15 having a first pattern 16 formed on a surface 151 and a second pattern 17 formed on a bottom surface 152 opposite to the surface 151. The key has various impressions due to the different depths of the first pattern and the second pattern from a light source at. However, one key only transmit a single color light coming from the light source. That is, the single key only reveals one single color. If the different key has to display different colors, light sources with different colors have to be used, which inevitably increases the cost.

Thus, it is an important subject to develop keyboards with variety and decrease their manufacturing cost simultaneously.

SUMMARY OF THE INVENTION

The invention provides a key capable of transmitting light with at least two colors, and a keyboard with the key.

The embodiment of the invention provides a key including a light-permeable body, a light-shading layer and a first dye layer. The light-shading layer is formed on the surface of the light-permeable body. The light-shading layer has a first light-permeable area and a second light-permeable area to expose the light-permeable body. The first dye layer is formed on the first light-permeable area.

The embodiment of the invention also provides a keyboard including a keyboard support and at least one key. The keyboard support has a opening. The key is disposed in the opening of the keyboard support and includes a light-permeable body, a light-shading layer and a first dye layer. The light-shading layer is formed on the surface. The light-shading layer has a first light-permeable area and a second light-permeable area to expose the light-permeable body. The first dye layer is formed on the first light-permeable area.

The embodiment of the invention also provides a keyboard including a keyboard support and at least one key. The keyboard support has an opening. The key is disposed in the opening of the keyboard support and includes a light-permeable body, a light-shading layer and a first dye layer. The light-shading layer is formed on the surface. The light-shading layer has a first light-permeable area and a second light-permeable area to expose the light-permeable body. The first dye layer is formed on the first light-permeable area.

As mentioned hereinabove, in the key and the keyboard of the embodiment, the light-shading layer has the first light-permeable area and the second light-permeable area. The first dye layer is formed on the first light-permeable area. In addition, the first dye layer may also be formed within the first light-permeable area. Thus, when a light source disposed at the back of the key emits a light ray, the user can observe the color produced after the light ray passes through the first dye layer in the first light-permeable area, and the original color of the light ray in the second light-permeable area. According to the coordination of dye layers, the color of the light ray observed by the user may be adjusted.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
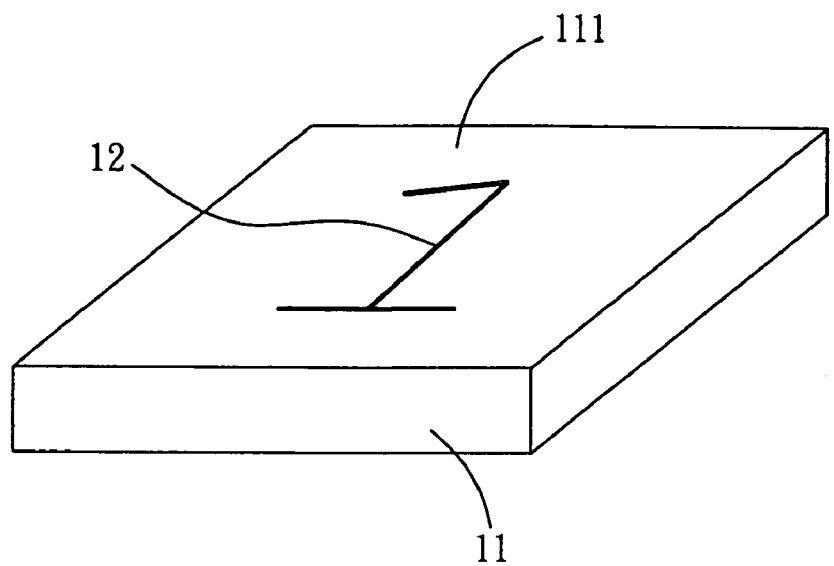
FIGS. 1A and 1B are schematic illustrations showing conventional keys.
Figure 1B:
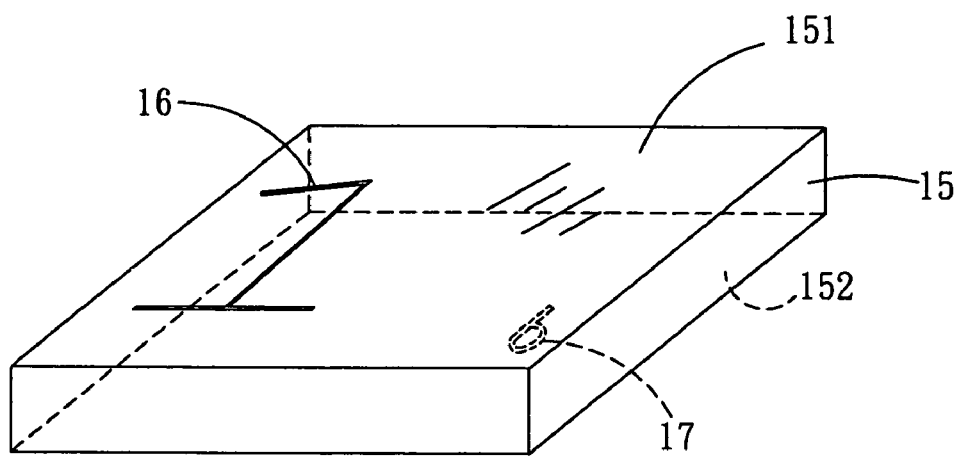
Figure 2:
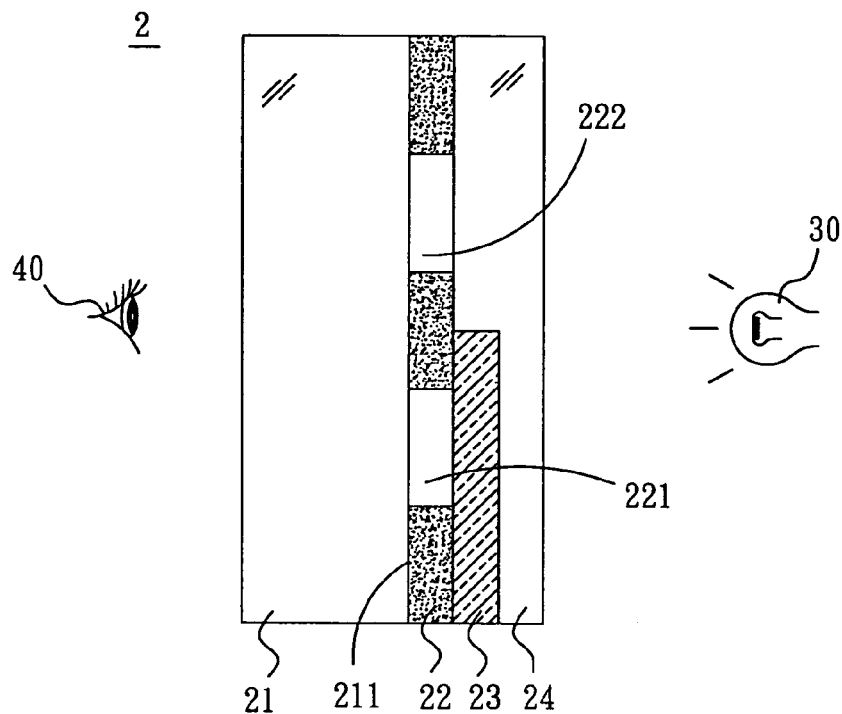
FIG. 2 is a schematic illustration showing a key according to an embodiment of the invention.

Referring to FIG. 2, a key 2 according to an embodiment of the invention includes a light-permeable body 21, a light-shading layer 22 and a first dye layer 23. Herein, in order to lengthen the lifetime of the key 2, the key 2 of this embodiment may include a protection layer 24.

In this embodiment, the light-permeable body 21 may be a transparent body, a translucent body, or a body with a color. For example, the light-permeable body 21 is made of a color material. In addition, a dye may be doped in the light-permeable body 21 such that the body has the color.

The light-shading layer 22 formed on the surface 211 of the light-permeable body 21. The light-shading layer 22 has a first light-permeable area 221 and a second light-permeable area 222 to expose the light-permeable body 21, both of which may be formed by way of laser engraving or etching. In addition, the first light-permeable area 221 or the second light-permeable area 222 may define a pattern of a letter or a symbol. In this embodiment, the light-shading layer 22 may be made of black ink, or any other material with the light-shading ability.

Figure 6:
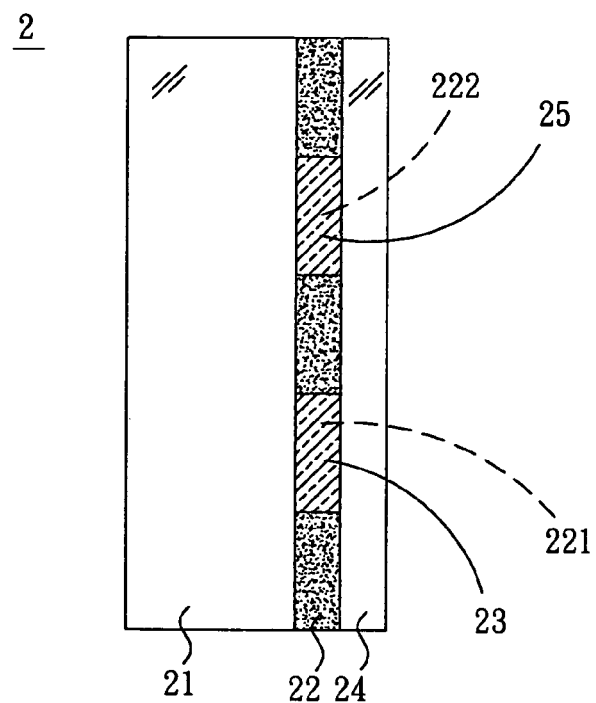
FIG. 6 is another schematic illustration showing the key according to the embodiment of the invention.

As shown in FIG. 2, the first dye layer 23 may be formed on the light-shading layer 22 by way of screen printing and cover the first light-permeable area 221. In addition, the first dye layer 23 may also be directly formed on the surface 211 of the light-permeable body 21 within the first light-permeable area 221, as shown in FIG. 6. The first dye layer 23 may be any light-permeable dye. In this embodiment, the first dye layer 23 may be a light-permeable dye with a color. For example, the first dye layer 23 may be an orange light-permeable dye.

Figure 3:
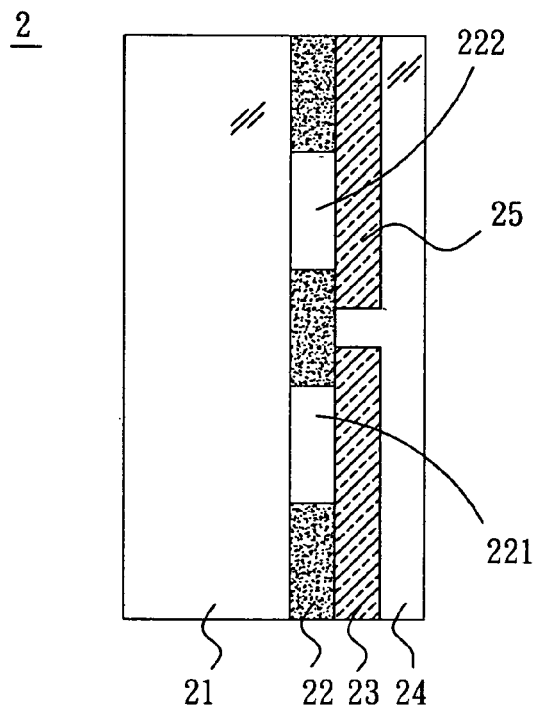
FIG. 3 is a schematic illustration showing the key including a third dye layer according to the embodiment of the invention.

As shown in FIG. 3, a third dye layer 25 may be additionally formed on the light-shading layer 22 in this embodiment. The third dye layer 25 covers the second light-permeable area 222. Of course, the third dye layer 25 may also be directly formed inside the second light-permeable area 222, as shown in FIG. 6. In this embodiment, the third dye layer 25 may be a green light-permeable dye.

As shown in FIGS. 2 and 3, the protection layer 24 is formed on the first dye layer 23 and a part of the light-shading layer 22 such that the first dye layer 23 and the light-shading layer 22 cannot be easily worn. In addition, if the key 2 is formed with the third dye layer 25, the protection layer 24 is formed on the first dye layer 23 and the third dye layer 25. In this embodiment, the protection layer 24 may also be formed on the first dye layer 23, the third dye layer 25 and a part of the light-shading layer 22. The protection layer 24 may be made of UV light-permeable lacquer in order to achieve the effect of protection.

Figure 8:
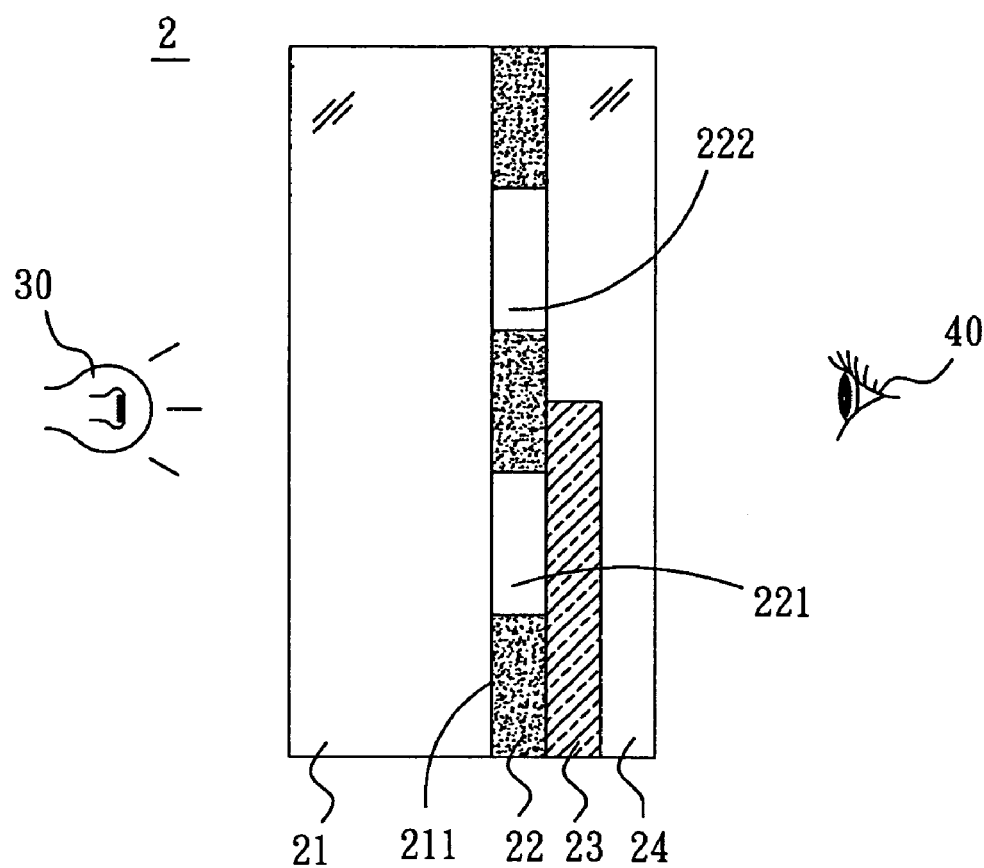
FIG. 8 is the other schematic illustration showing the key according to the embodiment of the invention.

As mentioned hereinabove, the key 2 of this embodiment may show various colors because a light source is disposed at the back of the key 2. For example, the light source emits white light. As shown in FIG. 2, when the light source 30 is disposed near a side of the protection layer 24, the user 40 may observe light rays with two different colors from a side of the light-permeable body 21. Of course, the light source 30 may also be disposed near a side of the light-permeable body 21, and the user 40 may observe the light rays with two different colors from a side of the protection layer 24, as shown in FIG. 8. In other words, the surface 211 of the light-permeable body 21 may be a front side of the light-permeable body 21 or a backside of the light-permeable body 21.

As shown in FIG. 2, in this embodiment, the user can observe the light rays with two different colors. When the light source emits the light ray to pass through the first dye layer 23 and the first light-permeable area 221, the user can observe the orange light ray within the first light-permeable area 221. Also, when the light source emits the light ray to pass through the second light-permeable area 222, the user can observe the white light ray within second light-permeable area 222. Also, as shown in FIG. 3, the user may observe the light rays with two different colors. One of the light rays is the orange light ray passing through the first dye layer 23 and the first light-permeable area 221, and the other of the light rays is the green light ray passing through the third dye layer 25 and the second light-permeable area 222.

Referring again to FIG. 4, it is also possible to form a second dye layer 26 between the surface 211 of the key 2 and the light-shading layer 22 in this embodiment. Herein, the second dye layer 26 may have a hollow area 261 positioned in correspondence with the first light-permeable area 221. Also, the hollow area 261 is smaller than the first light-permeable area 221, as shown in FIG. 5, and the function thereof will be described later.

Figure 4:
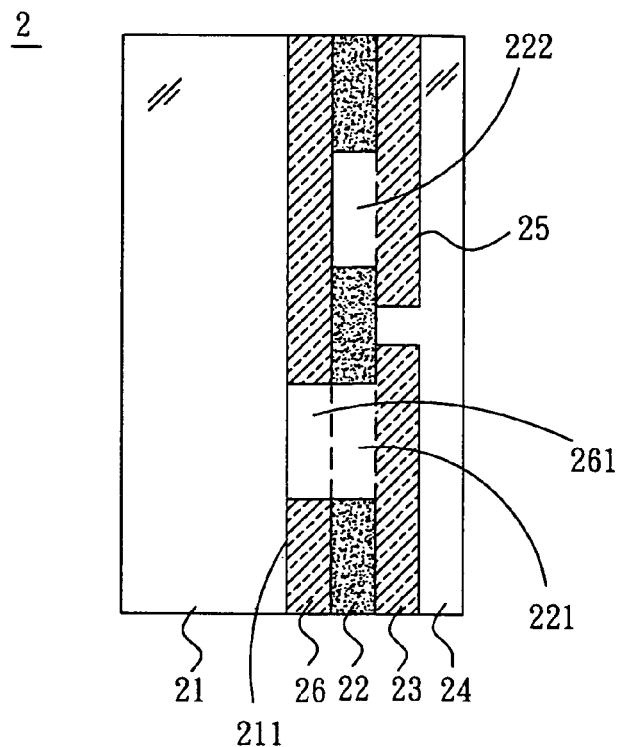
FIG. 4 is a schematic illustration showing the key including a second dye layer according to the embodiment of the invention.

Furthermore, as shown in FIG. 4, when the second dye layer 26 is a blue light-permeable dye, the key 2 may form other color variations using the second dye layer 26 such that the user observes the light rays with two different colors.

Figure 5:
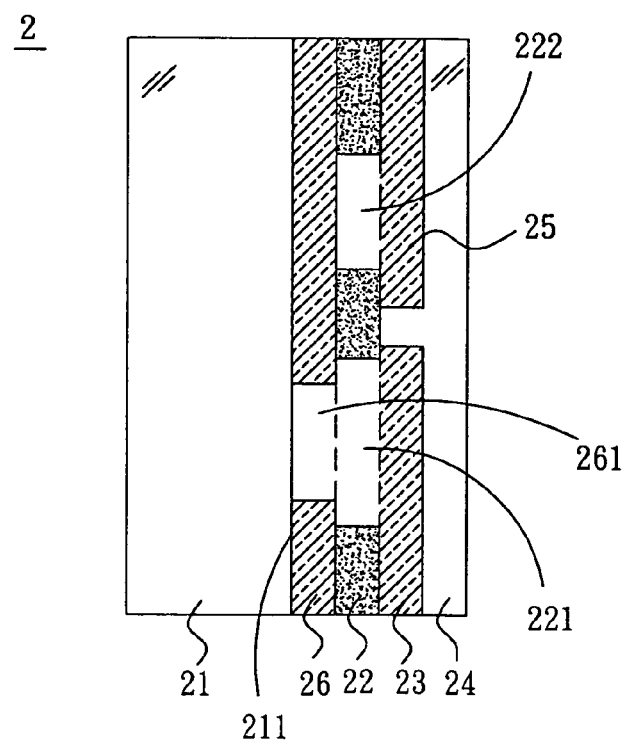
FIG. 5 is another schematic illustration showing the key including a second dye layer according to the embodiment of the invention.

In addition, as shown in FIG. 5, because the hollow area 261 may be not larger than the first light-permeable area 221, the color observed by the user may have more variations.

Figure 7:
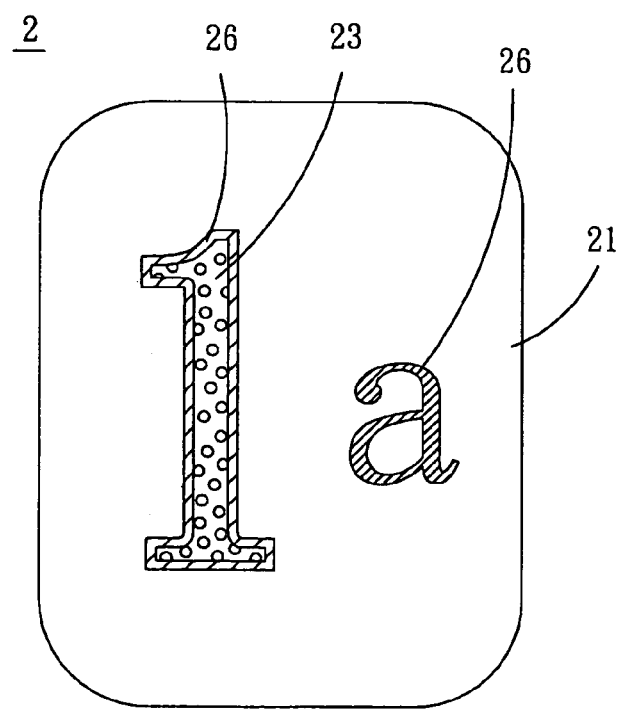
FIG. 7 is a top view showing the key according to the embodiment of the invention.

Furthermore, referring to FIG. 7, which is a top view of the key 2 of FIG. 5, the pattern "1" is defined by the first light-permeable area 221 and a part of the hollow area 261. Because the hollow area 261 is smaller than the first light-permeable area 221, the light rays observed by the user include the orange light ray (indicated by circles of FIG. 7) coming from the light source and passing through the first dye layer 23, and the mixed light ray (indicated by hatches of the pattern "1" of FIG. 7) coming from the light source and passing through a part of the first dye layer 23 and a part of the second dye layer 26. In addition, the pattern "a" is defined by the second light-permeable area 222, and the color observed by the user on the pattern "a" is the color composed of the light rays of the light source passing through the green third dye layer 25 and the blue second dye layer 26. If the dye doped in the key 2 is further utilized, more color effects can be created.

Figure 9:
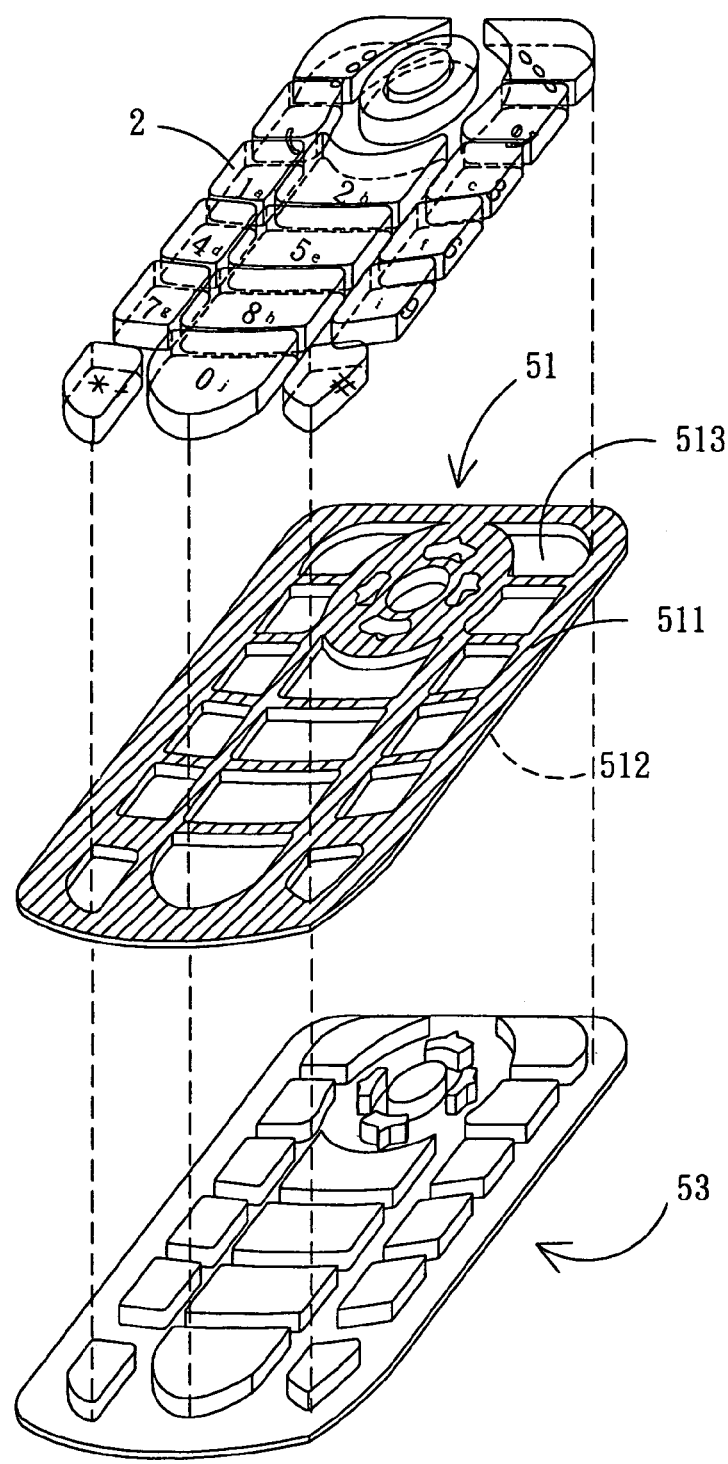
FIG. 9 is a schematic illustration showing a keyboard according to the embodiment of the invention.

Referring to FIG. 9, a keyboard 5 according to this embodiment of the invention is, for example, a mobile phone keyboard including a keyboard support 51, a plurality of keys 2 and a touch layer 53.

The keyboard support 51 has a first surface 511 and a second surface 512 opposite to the first surface 511, and the keyboard support 51 has a plurality of openings 513.

The keys 2 are disposed in the openings 513 of the first surface 511 of the keyboard support 51. Each key 2 has the structure mentioned hereinabove, so detailed descriptions thereof will be omitted.

The touch layer 53 is disposed on the second surface 512 of the keyboard support 51 and is connected with the keys 2 through the openings 513. A part of the touch layer 53 is in contact with the keyboard support 51. In addition, the touch layer 53 is connected with other circuit elements (not shown). When the user touches the key 2, a message instruction will be transferred to the circuit elements through the touch layer 53.

As mentioned hereinabove, in the key and the keyboard of the invention, the light-shading layer has the first light-permeable area and the second light-permeable area. The first dye layer is formed on the light-shading layer and covers the first light-permeable area. In addition, the first dye layer may also be formed within the first light-permeable area. Thus, when a light source disposed at the back of the key emits a light ray, the user can observe the color produced after the light ray passes through the first dye layer in the first light-permeable area, and observe the original color of the light ray in the second light-permeable area. Thus, the effect of forming the light ray with two colors on a single key may be achieved such that the key and the keyboard possess more color variations. Of course, the invention may also adjust the color of the light ray observed by the user according to the configuration of the second dye layer or the third dye layer.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A key, comprising:
   a light-permeable body;

a light-shading layer, which is formed on the surface of the light-permeable body and has a first light-permeable area and a second light-permeable area;

a first dye layer, which is formed on the first light-permeable area; and a second dye layer, which is formed between the surface and the light-shading layer and overs the first light-permeable area, wherein the second dye layer has a hollow area, the hollow area is positioned in the first light-permeable area, and the hollow area is not greater than the first light-permeable area.

2. The key according to claim 1, wherein the light-permeable body is the body with a color.

3. The key according to claim 1, wherein the light-permeable body is doped with a dye.

4. The key according to claim 1, further comprising:
a third dye layer, which is formed on the light-shading layer and covers the second light-permeable area.

5. The key according to claim 4, further comprising:
a protection layer, which is formed on the first dye layer and the third dye layer.

6. The key according to claim 1, further comprising:
a protection layer, which is formed on the first dye layer and the light-shading layer.

7. The key according to claim 6, wherein a light source is disposed adjacent to the protection layer.

8. The key according to claim 1, wherein a light source is disposed adjacent to the light-permeable body.

9. A keyboard, comprising:
a keyboard support, which has a first surface, a second surface opposite to the first surface, and at least one opening; and
at least one key, which is disposed in the opening of the keyboard support, the key comprising:
a light-permeable body;
a light-shading layer, which is formed on the surface of the light-permeable body and has
a first light-permeable area and a second light-permeable area;
a first dye layer, which is formed on the first light-permeable area; and
a second dye layer, which is formed between the surface and the light-shading layer and covers the first light-permeable area, wherein the second dye layer has a hollow area, the hollow area is positioned in the first light-permeable area, and the hollow area is not greater than the first light-permeable area.

10. The keyboard according to claim 9, further comprising:
a touch layer, which is disposed on the second surface of the keyboard support and is connected with the key through the opening.

11. The keyboard according to claim 9, wherein the light-permeable body is the body with a color.

12. The keyboard according to claim 9, wherein the light-permeable body is doped with a dye.

13. The keyboard according to claim 9, further comprising:
a third dye layer, which is formed on the light-shading layer and covers the second light-permeable area.

14. The keyboard according to claim 13, further comprising:
a protection layer, which is formed on the first dye layer and the third dye layer.

15. The keyboard according to claim 9, further comprising:
a protection layer, which is formed on the first dye layer and one part of the light-shading layer.

16. The keyboard according to claim 15, wherein a light source is disposed adjacent to the protection layer.

17. The keyboard according to claim 9, wherein a light source is disposed adjacent to the light-permeable body.

18. A keyboard, comprising:
a keyboard support, which has at least one opening; and
at least one key, which is disposed in the opening of the keyboard support, the key comprising:
a light-permeable body;
a light-shading layer, which is formed on the surface of the light-permeable body and has
a first light-permeable area and a second light-permeable area;
a first dye layer, which is formed on the surface of the light-permeable body in the first light-permeable area; and
a second dye layer, which is formed between the surface and the light-shading layer and covers the first light-permeable area, wherein the second dye layer has a hollow area, the hollow area is positioned in the first light-permeable area, and the hollow area is not greater than the first light-permeable area.

* * * * *